United States Patent Office 3,220,989
Patented Nov. 30, 1965

3,220,989
NUCLEAR PHOSPHONATED POLYSTYRENE POLYMER
Robert J. Rolih, Joliet, and Ellis K. Fields, Chicago, Ill., assignors to Standard Oil Company, Chicago, Ill., a corporation of Indiana
No Drawing. Filed July 24, 1962, Ser. No. 212,140
5 Claims. (Cl. 260—88.2)

This application is a continuation-in-part of S.N. 31,-554, filed May 25, 1960, and now abandoned.

This invention relates to novel modified hydrocarbon polymers and to methods of preparing same. More particularly, it relates to novel nuclear phosphonated derivatives of hydrocarbon polymers of styrene or other polymerizable monomers containing an aromatic nucleus.

Hydrocarbon polymers containing aromatic substituents such as polystyrene have poor fire resistance and flame retarding properties. Such hydrocarbon polymers, when ignited, normally continue burning after ignition and removal of the ignition source. Polymeric compositions which have fire resistant or flame retardancy properties have many uses which cannot be met by hydrocarbon polymers derived from aralkenes. Fire retardancy is the term used to describe the inability of a material to support combustion after removal from the source of ignition. In other words fire retardant compositions are self-extinguishing after removal from a flame used to heat and ignite the same.

It is known that the incorporation of phosphorus atoms as part of the polymeric chain improves the flame retardancy properties of such polymeric materials. Such incorporation of phosphorus is effected by copolymerizing aralkenes with phosphorus compounds containing aliphatic unsaturated substituents. The polymeric materials resulting from such copolymerization, while having fire resistance or flame retardancy properties, do not possess the other desirable physical properties such as strength, which is present in hydrocarbon polymers having only carbon-to-carbon bonds in the polymer chain.

It has been discovered that it is possible to phosphonate aromatic nuclei, having at least one replacable hydrogen atom on the aromatic nucleus, present in hydrocarbon polymers that are substantially free of aliphatic unsaturation derived from the polymerization of polymerizable aralkenes. The nuclear phosphonated hydrocarbon polymers obtained in accordance with this invention are new compositions of matter and are extremely useful per se or as chemical intermediates in the preparation of other compositions having unique properties. For example, these new nuclear phosphonated hydrocarbon polymers possess valuable flame resistance and flame retardant properties, particularly by exhibiting a pronounced ability to withstand ignition. If ignited by a direct flame application, they do not support combustion, but are immediately self-extinguishing on removal of the source of the flame. In spite of their resistance to flammability, these new polymers can be molded by compression or injection methods to give molded articles useful for a variety of purposes. Further it is possible to convert these new nuclear phosphonated hydrocarbon polymers to form metal salts thereof, which are extremely useful as lubricating oil additives.

Briefly, the nuclear phosphonated hydrocarbon polymers are prepared by reacting a hydrocarbon polymer substantially free of aliphatic unsaturation and containing aromatic substituents with a phosphite in the presence of a free-radical reactant. The free-radical phosphonation of the aromatic nuclei is effected by dissolving finely divided preformed solid hydrocarbon polymers in excess phosphonating agent, namely the phosphite, which acts as the reaction medium, and thereafter adding the free-radical reactant thereto. However, in those instances where the polymer is insoluble in the phosphite reactant, the reaction can be carried in an inert mutual solvent for said reactants. Exemplary mutual solvents are the saturated higher boiling point aliphatic hydrocarbons, such as hexane, heptane, octane, cyclooctane and decalin and lower viscosity solvent-extracted mineral oils from which normally occurring aromatic substituents have been removed therefrom.

A number of extremely reactive organic compounds have been found to dissociate and form free radicals under the influence of various forms of energy such as, for example, under the influence of actinic light and under the influence of a predetermined quantity of heat. The free radical has an abnormal valence but will not carry an electrical charge. Certain free radicals are stable and capable of independent existence for an extended period of time such as, for example, a period in excess of one hour. Free-radical reactants suitable for use in the present method comprise compounds which dissociate into free radicals under the influence of a temperature within the range of from about 0° C. to about 200° C. Illustrative examples of compounds possessing such properties are: diethyl percarbonate; allyl percarbonate; benzoyl peroxide; acetyl peroxide; para-chlorobenzoyl peroxide; methyl n-amyl ketone peroxide; methyl isobutyl ketone peroxide; methyl n-propyl ketone peroxide; methyl ethyl ketone peroxide; acetone peroxide; ethyl peroxide; methyl isobutyl peroxide; dicyclohexyl peroxide; di-tertiary-butyl peroxide; tertiary-butyl hydroperoxide; tertiary-butyl perbenzoate; 2,2-bis(tertiary-butylperoxy)butane; di-tertiary-butyl dipermalonate; tertiary-amyl perbenzoate; di-tertiary-alkyl peroxides. The preferred organic peroxides are di-tertiary-alkyl peroxides and tertiary-alkyl peroxy esters, specifically, di-tertiary-butyl peroxide, tertiary-butyl perbenzoate, and di-tertiary-butyl dipermalonate. These organic peroxides are preferable because of their stability with respect to handling and their stability with respect to storing.

The amount of the free-radical reactant employed in this invention can vary from about 0.01 to about 1.0 mole per mole equivalent of aromatic substituent in the polymer; the preferred ratio being about 0.1 mole of the free-radical reactant per mole equivalent of the aromatic substituent in the polymer.

The phosphites capable of being employed in the preparation of the nuclear phosphonated hydrocarbon polymers are di-esters of phosphorous acid having the formula H—P(O)(OR)$_2$ wherein R is a hydrocarbon radical having 1 to 20 carbon atoms selected from the group consisting of alkyl, cycloalkyl, aryl and aralkyl radicals. The amount of phosphite is at least equivalent on a molar basis to the amount of the free radical reactant employed. Exemplary of the phosphites which can be used as the phosphonating agent in the preparation of the nuclear phosphonated hydrocarbon polymers of this invention are the saturated di-esters of phosphorus acid such as dimethyl phosphite, diethyl phosphite, dibutyl phosphite, dioctyl phosphite, didodecyl phosphite, diocta decyl phosphite, dicyclohexyl phosphite, dicyclooctyl phosphite, diphenyl phosphite, diphenylethyl phosphite, dinaphthyl phosphite, etc. Any hydrocarbon polymer substantially free of aliphatic unsaturation containing aromatic substituents has been found to be susceptible to nuclear phosphonation in accordance with this invention. Illustrative of the such hydrocarbon polymers are those resulting from the polymerization of polymerizable aralkene monomers and such polymers obtained by the copolymerization of the aralkene monomers and polymerizable olefins containing 2 to 12 carbon atoms. Illustrative of the aralkene monomers are the aryl vinyl compounds, such as styrene, vinyl naphthalene, divinylbenzene, alpha-methyl styrene, para-ethyl styrene, isopropyl styrene, cyclohexyl styrene, methyl styrene, isopropyl-alpha-methyl styrene, cyclohexyl-alpha-methyl styrene, vinyl diphenyl styrene, amyl styrene, dodecyl styrene, butyl styrene, dimethyl styrene. Illustrative olefins are ethylene, propylene, butene, butadiene, hexene, octene, dodecene, wherein the ethylenic unsaturation is internal or in the terminal positions. Since the introduction of phosphorus into the structure of the hydrocarbon polymer is effected through the nuclear phosphonation of the aromatic nuclei, the polymerization or copolymerization of the aralkenes must be conducted prior to the phosphonation reaction so that solid hydrocarbon polymers are obtained that are substantially free of aliphatic unsaturation. Such polymerization of aralkene monomers or copolymerization of the aralkene with other olefinic hydrocarbons is effected by known polymerization techniques.

Inasmuch as the preparation of the nuclear phosphonated hydrocarbon polymers of this invention is conducted by dissolving solid particles of preformed hydrocarbon polymers containing aromatic substituents, it is advisable that the solid particles be as finely divided as possible prior to solubilizing such polymers in the phosphite reactant or mutual solvent reaction medium. Subdivision of preformed hydrocarbon polymers can be effected in known manners, such as by grinding so as to obtain particle sizes less than 25 microns, which particle sizes have been found to be most effective for dissolving such polymers in the reaction medium. Hydrocarbon polymers prepared by emulsion polymerization techniques have been found to be highly suitable without further treatment for use in this invention.

The degree of phosphonation is determined by the amount of free radical reactant used, since this phosphonation reaction is usually conducted in the phosphonating reactant as the reaction medium. In general, the reaction temperature does not critically determine the free radical phosphonation of the aromatic nuclei in the polymer by the phosphonyl free radical formed during the reaction in the presence of the free radical reactant. However, as chemical reactions, in general, occur at a more rapid rate at elevated temperatures, it has been found particularly desirable for high yields to employ temperatures above the decomposition temperature of peroxide catalyst and below the decomposition temperature of the nuclear phosphonated hydrocarbon polymer produced by the reaction. Thus, the reaction temperature may be from about 0° to about 200° C. However, it is preferred to conduct the reaction at temperatures in the range of from about 75° C. to about 175° C.

The nuclear phosphonated hydrocarbon polymer is prepared by simply mixing the polymer with the phosphite and the free radical reactant and thereafter allowing the mixture to react for a period of about 1 to about 48 hours, depending upon the temperature, while preferentially maintaining the temperature in the range of from about 75° C. to about 175° C. Recovery and purification of the nuclear phosphonated hydrocarbon polymer can be effected by the same techniques used in preparing conventional solid hydrocarbon polymers.

In the illustrative embodiments, showing the preparation of nuclear phosphonated hydrocarbon polymers containing aromatic substituents, presented in the following examples, the preformed hydrocarbon polymers were found to be substantially free of aliphatic unsaturation by the inability to add bromine to such polymers.

*Example I*

A charge of 50 g. (0.48 mole equivalent of aromatic substituent) of polystyrene (intrinsic viscosity 0.74), 50 g. (0.36 mole) of diethyl phosphite, and 5 g. (0.034 mole) of di-tert-butyl peroxide, being 0.07 mole per mole equivalent of aromatic substituent, was produced in a round-bottom flask equipped with a stirrer, thermometer and condenser. The charge was heated with continuous stirring to 140° C. and maintained under reflux conditions at said temperature for three hours. Thereafter, the reaction mixture was cooled to below 100° C. and water added thereto. The resultant aqueous mixture was then transferred to a Waring Blender, wherein the solids were washed several times with water, followed by several washings with ethanol. 59.9 g. containing 3% phosphorus was obtained after drying the washed product at 85° C. under reduced pressure.

*Example II*

To a reaction flask was charged 44.8 g. (0.43 mole equivalent of phenyl substituent) polystyrene (of Example I), 110.8 g. (0.8 mole) of diethyl phosphite and 1.51 g. (0.01 mole) of a di-tert-butyl peroxide (0.023 molar equivalent). The reaction mixture was slowly heated with continuous stirring to 140° C. under reflux conditions and maintained at said temperature for two hours. 46 g. of nuclear phosphonated polymer containing 1.59% phosphorus was recovered from the reaction mixture in the manner described in Example I.

*Example III*

A reaction mixture of 52 g. (0.5 mole equivalent of aromatic substituent) polystyrene, 96 g. (0.5 mole) diethyl phosphite and 37 g. (0.253 mole) di-tert-butyl peroxide (0.5 molar equivalent) was slowly heated with continuous stirring to 122° C. and maintained under reflux conditions at said temperature for 24 hours. The nuclear phosphonated polymer recovered in the manner described in Example I contained 3.95% phosphorus.

*Example IV*

52 g. (0.5 mole equivalent of phenyl substituent) polystyrene, 69 g. (0.5 mole) diethyl phosphite and 14 g. (0.5 mole) of di-tert-butyl peroxide were charged to the reactor. The mixture was slowly heated to about 100° C. and held under reflux conditions at said temperature for 24 hours. Thereafter the hot reaction mixture was poured into acetone in a Waring Blendor. Since the nuclear phosphonated polymer dissolved in the acetone, hexane was added to the acetone solution to precipitate the polymer, during mixing in the blender. Thereafter, the acetone-hexane mixture was separated and the precipitated polymer then washed three times successively with fresh hexane. The nuclear phosphonated polymer, dried in a vacuum oven at 85° C., contained 5.44% phosphorus.

Samples of each of the phosphonated polymers obtained in Examples I–IV were compression molded at 180° C. and 4000 p.s.i.g. into solid pellets. These phosphonated solid pellets, when exposed to an open flame, were found to be flame retardant and self-extinguishing when removed therefrom; whereas the pellets from the original polystyrene burned rapidly in the igniting flame and did not extinguish after removal therefrom.

*Example V*

A mixture of isobutylene and styrene in a mole ratio of 10:1 of isobutylene to styrene was copolymerized at a temperature ranging from about −70° to about −90° C. while bubbling catalytic amounts of gaseous boron trifluoride through the mixture for about 30 minutes. The resulting copolymer was dissolved, reprecipitated and distilled to remove unreacted monomer and solvents.

*Example VI*

60 g. (0.58 mole weight unit) of the copolymer prepared in accordance with the procedure set forth in Example V was mixed with 50 g. (0.36 mole) of diethyl hydrogen phosphite and 14.6 g. (0.1 mole) of di-tert-butyl peroxide. The copolymer-phosphite-peroxide mixture was heated to reflux at 100° C. for a period of 24 hours. The temperature of the reaction mixture increased from 100° C. to 111° C. near the end of the 24 hour period. The homogeneous reaction mixture was subsequently dissolved in 1.5 liters of toluene. The toluene solution was shaken vigorously with 0.5 liter of water and the emulsion that formed was heated by way of a steam bath until the layers separated. The toluene layer was drawn off and refluxed for 24 hours with 50 g. (0.16 mole of $$Ba(OH)_2 \cdot 8H_2O$$

A Dean-Stark water separator was then attached to the reaction vessel and the toluene was dehydrated. The toluene solution was subsequently filtered through Celite and evaporated on a Rinco evaporator under reduced pressure to yield 70 g. of viscous, light yellow, transparent product. The product contained 1.22% by weight Ba and 0.85% by weight P.

*Example VII*

The following tests illustrate the viscosity-improving properties of the barium-containing nuclear phosphonated copolymers. The barium-containing nuclear phosphonated copolymer prepared as set forth in Example VI was added in 2% concentration to a base oil consisting of a solvent extracted SAE 10 lubricating mineral base oil and the viscosity index was then determined and compared with the viscosity index of the base oil alone and the base oil containing 2% of a 10:1 isobutylene:styrene copolymer prepared as set forth in Example V. Comparative results are reported in Table I.

TABLE I

| Composition: | Viscosity index |
|---|---|
| Base oil alone | 8 |
| Base oil containing 2% of 10:1 isobutylene:styrene copolymer | 133 |
| Base oil containing 2% of the addition agent prepared in Example VI | 132 |

*Example VIII*

The dispersancy and detergency characteristics of the barium-containing nuclear phosphonated copolymer were tested by carbon black suspension test. In the carbon black suspension test, the products prepared in Examples V and VI were compared. The product obtained in Example V and the product obtained in Example VI was stirred separately for 5 minutes in a 100 cc. graduate in a Herschel demulsibility tester at concentrations of 0.5% in kerosene with carbon black at room temperature (25° C.). Each mixture was then allowed to stand and the tendency for the carbon to settle was noted as recorded in Table II:

TABLE II

| Material | Percent charcoal settled | Time |
|---|---|---|
| Product obtained in Example V | 100 | 32 min. |
| Product obtained in Example VI | 0 | 192 hours. |

The ability of the barium-containing phosphonated copolymer to act as a viscosity improver and to act as a detergent is clearly shown by the above data.

Thus, having described the invention, what is claimed is:

1. A nuclear phosphonated hydrocarbon copolymer, being substantially free of aliphatic unsaturation, of styrene and a polymerizable $C_{2-12}$ alkene monomer, said copolymer containing nuclear phosphonated phenyl groups represented by the formula

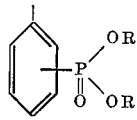

wherein R is a hydrocarbon group having 1 to 20 carbon atoms of the group consisting of alkyl, cycloalkyl, aryl and aralkyl, and at least about 0.25% phosphorus.

2. The composition of claim 1 wherein said alkene monomer is isobutylene.

3. The composition of claim 2 wherein R is ethyl.

4. A nuclear phosphonated polystyrene, being substantially free of aliphatic unsaturation, containing nuclear phosphonated phenyl groups represented by the formula

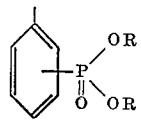

wherein R is a hydrocarbon group having 1 to 20 carbon atoms of the group consisting of alkyl, cycloalkyl, aryl and aralkyl, and at least about 0.25% phosphorus.

5. The composition of claim 4 wherein R is ethyl.

References Cited by the Examiner

UNITED STATES PATENTS

| 2,274,749 | 3/1942 | Smyers | 260—88.2 |
| 2,786,032 | 3/1957 | Hollyday et al. | 252—59 |
| 2,863,834 | 12/1958 | Buckmann | 252—32.5 |
| 3,054,821 | 9/1962 | Rolih et al. | 260—461 |

OTHER REFERENCES

Koslapoff, Organophosphorous Compounds, John Wiley & Sons, New York (1950), pages 128, 129, and 165.

JOSEPH L. SCHOFER, *Primary Examiner.*

JAMES A. SEIDLECK, *Examiner.*